United States Patent [19]
Irwin et al.

[11] Patent Number: 5,930,428
[45] Date of Patent: Jul. 27, 1999

[54] BLIND-MATE FIBER OPTIC CONNECTOR WITH INTEGRAL OPTOELECTRONIC RECEIVER CIRCUITS

[75] Inventors: Scott A. Irwin, Cedar Rapids; John A. Rupp, Swisher, both of Iowa

[73] Assignee: Rockwell Science Center, Inc., Thousand Oaks, Calif.

[21] Appl. No.: 08/909,979

[22] Filed: Aug. 12, 1997

[51] Int. Cl.[6] .............................. G02B 6/00; G02B 6/36
[52] U.S. Cl. .............................................................. 385/88
[58] Field of Search ............................. 340/500; 385/82, 385/88, 92, 93, 33, 27, 137; 438/41, 507, 944; 264/2.5; 114/20.1

[56] References Cited

U.S. PATENT DOCUMENTS

| | | | |
|---|---|---|---|
| 4,184,741 | 1/1980 | Hawk et al. | 385/92 |
| 5,504,828 | 4/1996 | Cina et al. | 385/33 |
| 5,535,296 | 7/1996 | Uchida | 385/89 |
| 5,764,832 | 6/1998 | Tabuchi | 385/88 |

*Primary Examiner*—Akm E. Ullah
*Attorney, Agent, or Firm*—Kyle Eppele; James P. O'Shaughnessy

[57] ABSTRACT

A connected fiber optic electrical or avionics system is disclosed. The system includes a line replaceable unit (LRU), such as an avionics primary flight display LRU, adapted for insertion into a chassis such as an airframe. An LRU connector coupled to the LRU and adapted for mating with a chassis connector plug includes an active optoelectronic device mounted therein for operatively coupling to an optical termination in the chassis connector plug. Inclusion of the active optoelectronic device in the LRU connector eliminates the need for the active optoelectronic device to be mounted on a printed circuit board, as well as the need for a fiber pigtail connecting the connector and the printed circuit board.

20 Claims, 3 Drawing Sheets

BLIND-MATE FIBER OPTIC CONNECTOR WITH INTEGRAL OPTOELECTRONIC RECEIVER CIRCUITS

FIELD OF INVENTION

The present invention relates generally to aviation electronics (avionics). More particularly, the present invention relates to avionics systems or line replaceable units (LRUs), such as a primary flight display (PFD), having active optoelectronic devices positioned in the connector of the LRU.

BACKGROUND OF THE INVENTION

Aircraft PFDs and other systems, modules or LRUs require blind-mate connectors for attaching the system to the aircraft instrument tray. When fiber optics is used as the transmission media carrying data and control signals to and from the LRU, the fiber interface must be terminated to an active optoelectronic device such as an optoelectronic receiver or transmitter. The active optoelectronic device is typically mounted on a printed circuit board (PCB) located within the housing of the LRU. Thus, in a passive connector system, this requires the use of a short fiber pigtail between the LRU connector receptacle and the active optoelectronic device mounted on the PCB. The necessary 90 degree bend of the fiber pigtail from the connector to the PCB typically requires between two and four inches of depth within the LRU. Thus, conventional avionics systems using fiber optics as the transmission media experience a significant depth penalty. Since there is little available space in the cockpit of an aircraft, the additional depth needed for the avionics system is a very undesirable requirement.

SUMMARY OF THE INVENTION

A connected fiber optic electrical or avionics system is disclosed. The system includes a line replaceable unit (LRU), such as an avionics primary flight display, adapted for insertion into a chassis such as an airframe. An LRU connector coupled to the LRU and adapted for mating with a chassis connector plug includes an active optoelectronic device mounted therein for operatively coupling to an optical termination in the chassis connector plug. Inclusion of the active optoelectronic device in the LRU connector eliminates the need for the active optoelectronic device to be mounted on a printed circuit board, as well as the need for a fiber pigtail connecting the connector and the printed circuit board.

DETAILED DESCRIPTION OF THE PREFERRED EMBODIMENTS

Figure 1:
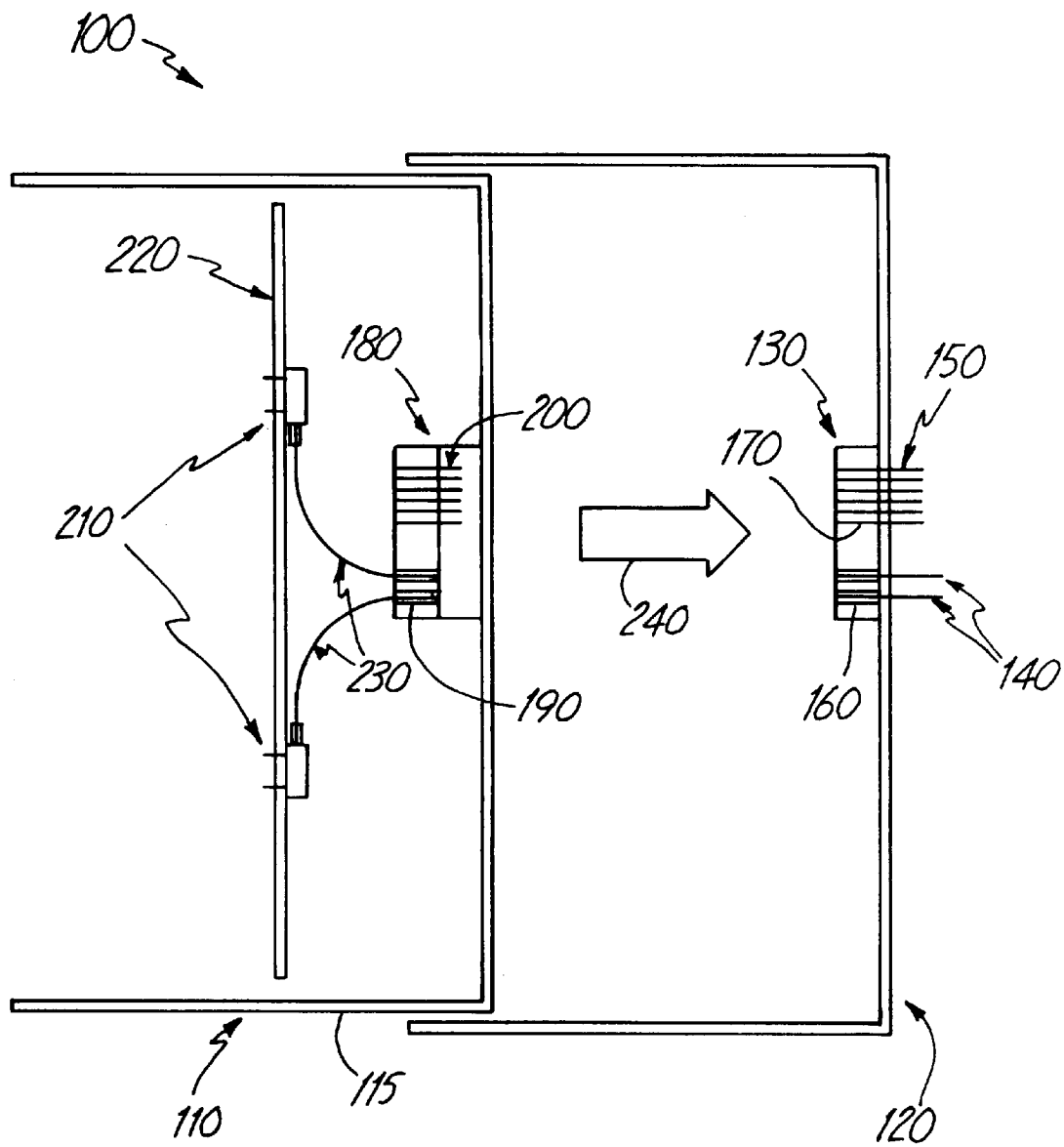
FIG. 1 is a diagrammatic illustration of a prior art avionics system having an LRU of the type which receives data and control signals over optical fibers and which requires fiber pigtails between the connector receptacle and active optoelectronic devices mounted on a PCB.

FIG. 1 is a diagrammatic illustration of prior art avionics system 100 having a removable LRU or module 110, such as an aircraft PFD, insertable into fixed chassis 120. Chassis 120 can be, for example, an instrument tray or airframe. Chassis 120 includes connector plug 130 connected to optical fibers 140 and non-optical transmission paths 150. Fibers 140 and non-optical transmission paths 150 carry signals transmitted or received by LRU 110. Connector plug 130 includes optical terminations 160 coupled to fibers 140 and non-optical contacts 170 coupled to non-optical transmission paths 150. Optical terminations 160 can be, for example, expanded beams or butt joints. Non-optical contacts 170 can be, for example, electrical, coax or high current contacts.

LRU 110 includes LRU connector receptacle 180 having optical terminations 190 adapted to interface with optical terminations 160 when connector receptacle 180 is mated with connector plug 130. Connector receptacle 180 also has non-optical contacts 200 adapted to interface with non-optical contacts 170 when the receptacle and plug are mated. One or more active optoelectronic devices 210, such as receivers and/or laser diode transmitters, are mounted on PCB 220. Active optoelectronic devices 210 are coupled to optical terminations 190 via fiber pigtails 230. Optoelectronic devices 210 can, for example, convert electrical signals from LRU 110 into optical signals for transmission over fibers 140, or convert optical signals received over fibers 140 into electrical signals for use in LRU 110. Typically, the 90 degree bend of fiber pigtails 230 can require a spacing of PCB 220 from connector receptacle 180 and the rear of LRU housing 115 of between two and four inches, depending upon a minimum bend radius of the fiber pigtails. This effectively wasted space is very disadvantageous in avionics systems where available space is greatly limited.

Figure 2:
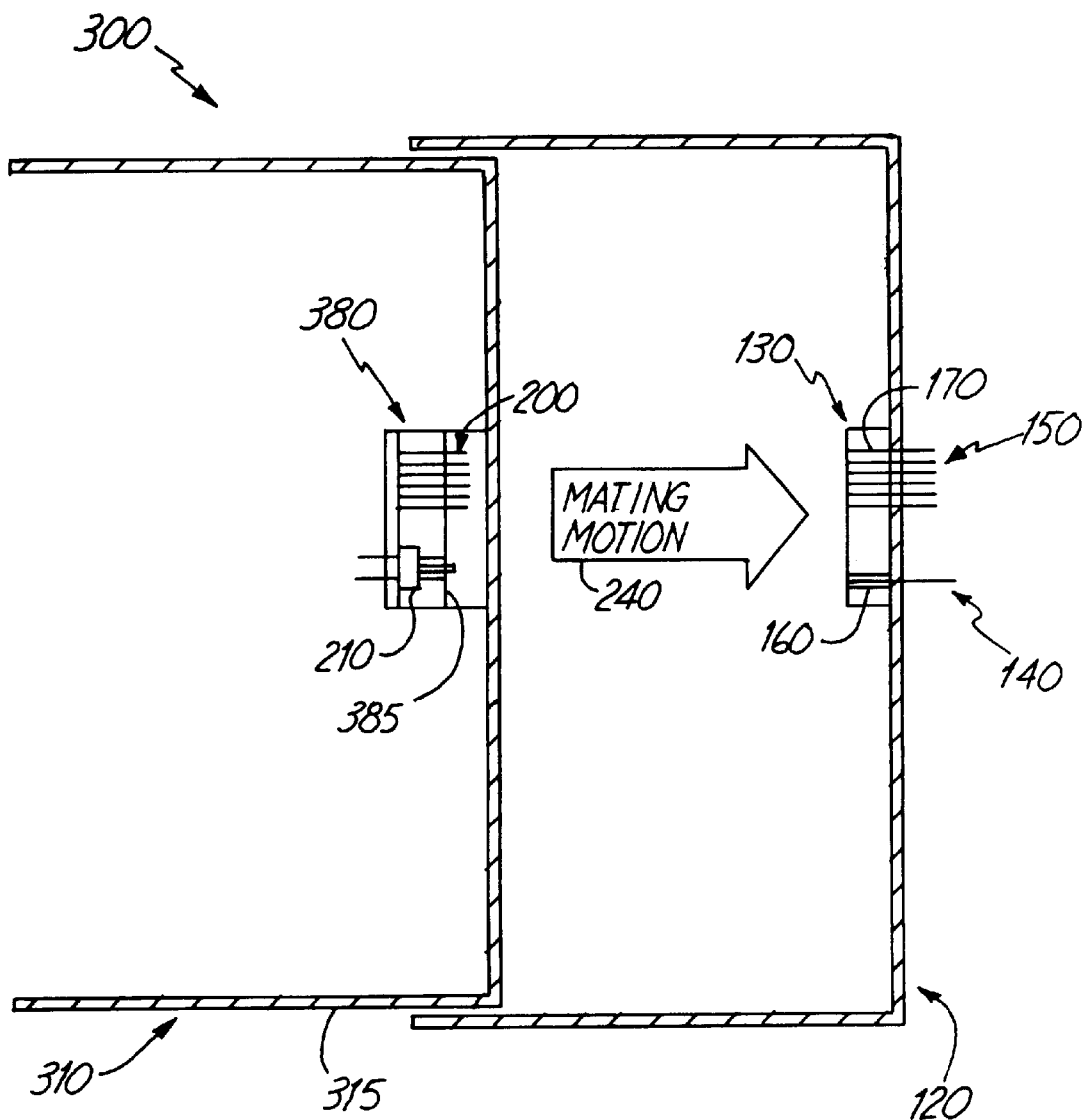
FIG. 2 is a diagrammatic illustration of an avionics system including an LRU, in accordance with preferred embodiments of the present invention, having one or more active optoelectronic devices mounted integrally within an LRU connector receptacle and adapted to transmit and receive both optical and electrical data and control signals.

FIG. 2 is a diagrammatic illustration of avionics system 300 in accordance with preferred embodiments of the present invention. System 300 includes LRU or module 310 having housing 315 adapted for insertion into chassis 120 in the direction indicated by arrow 240. LRU 310 differs from LRU 110 illustrated in FIG. 1 in that it includes receptacle 380 having one or more active optoelectronic devices 210 integrally mounted therein. By mounting optoelectronic device(s) 210 within receptacle 380, PCB 220 and fiber pigtails 230 can be eliminated. Elimination of fiber pigtails 230 and PCB 220 also eliminates the depth penalty associated with the 90 degree bend of the fiber pigtail from the connector to the PCB.

In operation, as housing 315 of LRU 310 is inserted into chassis 120, connector receptacle 380 is mated with connector plug 130. Non-optical contacts 170 mate with non-optical contacts 200 in order to complete the connection between non-optical transmission paths 150 and LRU 310. Active optoelectronic device(s) 210 mate with optical terminations 160. Thus, if an active optoelectronic device 210 is a receiver, the device 210 receives optical signals from fibers 140 and converts the signals into electrical signals for use by LRU 310. Likewise, if an active optoelectronic device 210 is a transmitter, the device 210 receives electrical signals and converts the electrical signals into optical signals for transmission over fibers 140. Transparent cover 385 protects active optoelectronic device 210 and can be wiped clean to remove dust or debris.

Figure 3:
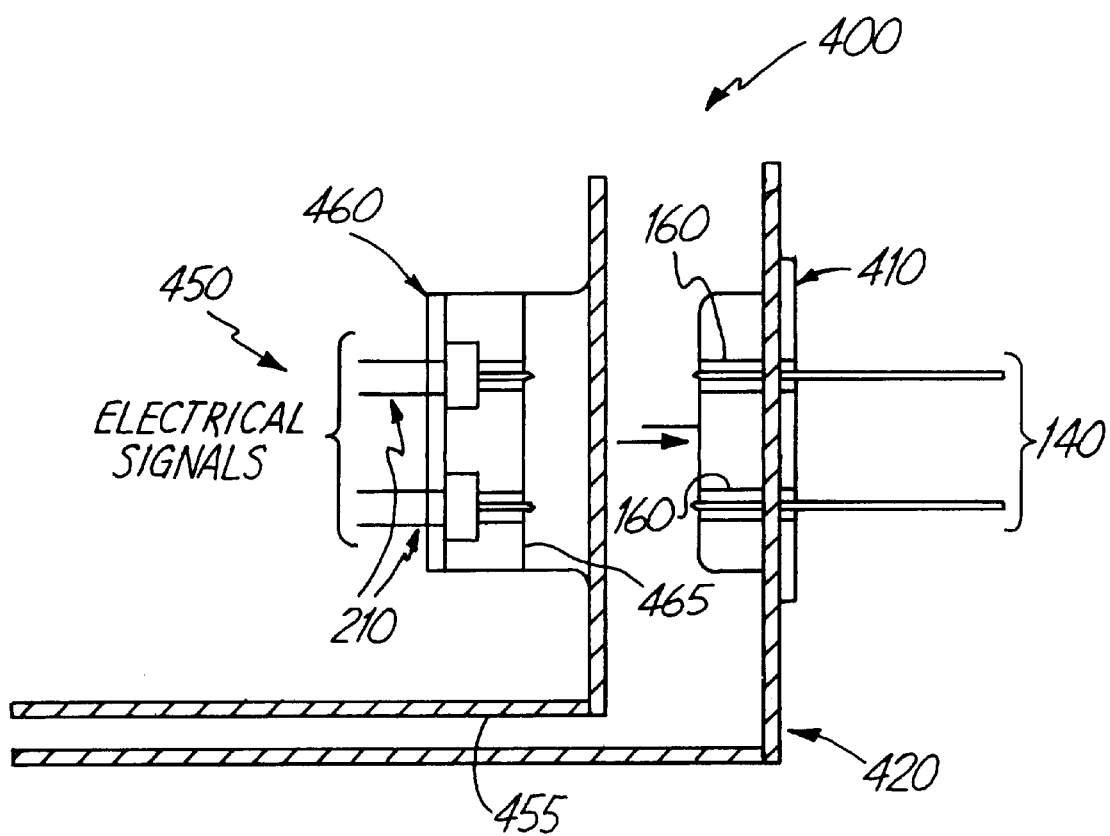
FIG. 3 is a diagrammatic illustration of a portion of an avionics system including an LRU, in accordance with alternate embodiments of the present invention, having multiple active optoelectronic devices mounted integrally within the LRU connector receptacle and adapted to transmit and receive only optical signals.

FIG. 3 is a diagrammatic illustration of avionics system 400 in accordance with other preferred embodiments of the present invention. Avionics system 400 includes LRU 450 having housing 455 which is insertable into chassis 420. Chassis 420 includes connector plug 410. LRU 450 includes connector receptacle 460 mounted therein. System 400 differs from system 300 illustrated in FIG. 2 only in that all signals carried to and from LRU 450 are optical signals transmitted over fibers 140. Therefore, connector plug 410 only includes optical terminations 160. Likewise, connector receptacle 460 differs from connector receptacle 380 in that it includes active optoelectronic devices 210, but it does not include non-optical contacts. When mated, devices 210 couple with optical terminations 160. When LRU 450 is removed from chassis 420, transparent cover 465 can be cleaned to remove dust and other contaminants which interfere with optical signal transmission.

The electrical or other avionics systems of the present invention provide significant advantages over the prior art. By incorporating active optoelectronic devices in the connector receptacle of the LRU, the depth of the LRU can be minimized. Further, without the need for PCB mounted active optoelectronic devices and fiber pigtails traversing a 90 degree bend, the manufacturability of the connected avionics LRUs of the present invention is improved. With the present invention facilitating the use of fiber optics as the primary mode of communication, and with the increased data transfer rates associated with fiber optics, LRUs having less complex internal electronics can be implemented. Further, by including a glass or other transparent cover over all fiber optic connections in the connector receptacle, only a wipe is necessary to clean the glass when the LRU is pulled from the chassis.

Although the present invention has been described with reference to preferred embodiments, workers skilled in the art will recognize that changes may be made in form and detail without departing from the spirit and scope of the invention.

What is claimed is:

1. An electrical system comprising:
   a connector plug mounted in a chassis, the connector plug having an optical termination coupled to an optical fiber, the optical fiber carrying optical signals to or from the connector plug; and
   a line replaceable unit (LRU) contained substantially within a housing adapted for insertion into the chassis, wherein the LRU includes a connector receptacle adapted for mating with the connector plug when the housing is inserted into the chassis, wherein the connector receptacle includes an active optoelectronic device mounted therein and adapted to couple with the optical termination in the connector plug and to thereby couple with the optical fiber carrying signals to or from the connector plug.

2. The electrical system of claim 1, wherein the active optoelectronic device mounted in the connector receptacle is an optoelectronic transmitter adapted to receive electrical signals from the LRU and to convert the electrical signals into corresponding optical signals for transmission over the optical fiber.

3. The electrical system of claim 2, wherein the optoelectronic device mounted in the connector receptacle is a laser diode.

4. The electrical system of claim 1, wherein the active optoelectronic device mounted in the connector receptacle is an optoelectronic receiver adapted to receive optical signals from the optical fiber and to convert the optical signals into electrical signals for use by the LRU.

5. The electrical system of claim 1, wherein the optical termination in the connector plug is an expanded beam.

6. The electrical system of claim 1, wherein the optical termination in the connector plug is a butt joint.

7. The electrical system of claim 1, wherein the connector receptacle also includes non-optical contacts mounted therein for operatively coupling to non-optical contacts in the connector plug.

8. The electrical system of claim 1, wherein the LRU is a primary flight display (PFD) in an avionics system.

9. An avionics system comprising:
   an avionics line replaceable unit (LRU) adapted for insertion into an airframe; and
   an LRU connector coupled to the avionics LRU and adapted for mating with an airframe connector coupled to the airframe when the avionics LRU is inserted into the airframe, wherein the LRU connector includes an active optoelectronic device mounted therein for operatively coupling to an optical termination in the airframe connector.

10. The avionics system of claim 9, wherein the active optoelectronic device mounted in the LRU connector is an optoelectronic transmitter adapted to receive electrical signals from the avionics LRU and to convert the electrical signals into corresponding optical signals for transmission over optical fibers coupled to the optical termination in the airframe connector.

11. The avionics system of claim 10, wherein the optoelectronic device mounted in the LRU connector is a laser diode.

12. The avionics system of claim 9, wherein the active optoelectronic device mounted in the LRU connector is an optoelectronic receiver adapted to receive optical signals from optical fibers coupled to the optical termination in the airframe connector and to convert the optical signals into electrical signals for use by the avionics LRU.

13. The avionics system of claim 9, wherein the optical termination in the airframe connector is an expanded beam.

14. The avionics system of claim 9, wherein the optical termination in the airframe connector is a butt joint.

15. The avionics system of claim 9, wherein the LRU connector also includes non-optical contacts mounted therein for operatively coupling to non-optical contacts in the airframe connector in order to transmit or receive non-optical signals over a non-optical transmission path coupled to the non-optical contacts in the airframe connector.

16. The avionics system of claim 9, wherein the avionics LRU is a primary flight display (PFD).

17. A primary flight display comprising:
   a housing adapted for insertion into an airframe; and
   a connector receptacle coupled to the housing and adapted for mating with a connector plug coupled to the airframe when the housing is inserted into the airframe, wherein the connector receptacle includes an active optoelectronic device mounted therein for operatively coupling to an optical termination in the connector plug, and thereby coupling to an optical fiber carrying signals to or from the connector plug.

18. The primary flight display of claim 17, wherein the active optoelectronic device mounted in the connector receptacle is an optoelectronic transmitter.

19. The primary flight display of claim 17, wherein the active optoelectronic device mounted in the connector receptacle is an optoelectronic receiver.

20. The primary flight display of claim 17, wherein the connector receptacle also includes non-optical contacts mounted therein for operatively coupling to non-optical contacts in the connector plug.

* * * * *